Figure 1:
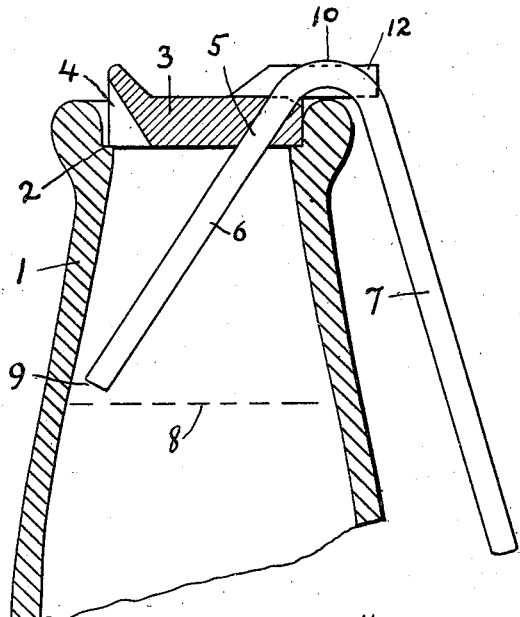

July 19, 1938.  R. G. COATES  2,124,053

CREAM REMOVER

Filed April 12, 1937

INVENTOR.

Ray G. Coates

Patented July 19, 1938

2,124,053

UNITED STATES PATENT OFFICE 2,124,053

CREAM REMOVER

Ray G. Coates, Pasadena, Calif.

Application April 12, 1937, Serial No. 136,252

2 Claims. (Cl. 137—20)

In removing cream from common milk bottles by decanting the cream over the top of the bottle more or less milk goes over with the cream. Devices are known for siphoning out the cream. These devices use air pressure on top of the cream or suction applied to the discharge end of the siphon to start the cream flowing.

The purpose of my invention is the easy removal of the pure cream that rises to the top of the milk bottle.

A second purpose is to construct a device that is very simple, easily cleaned, and cheap to fabricate.

In my device the siphon is started by the gravitational action of the cream itself, without any changes of air pressure at either end of the siphon. This I accomplish by particular locations for the intake end of the siphon and also the crest of the siphon, combined with a bottle stopper which prevents leakage of milk between the bottle and the stopper, and yet always permits atmospheric pressure on top of the cream.

The drawing illustrates an embodiment of my invention which shows one form of construction. I do not limit myself to this particular form or the materials mentioned but contemplate using it in any form in which it may be applied and made of any present known materials which may be suitable.

Figure 2:
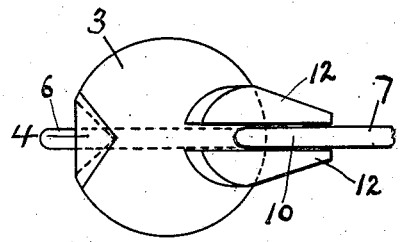
Figures 3, 4:
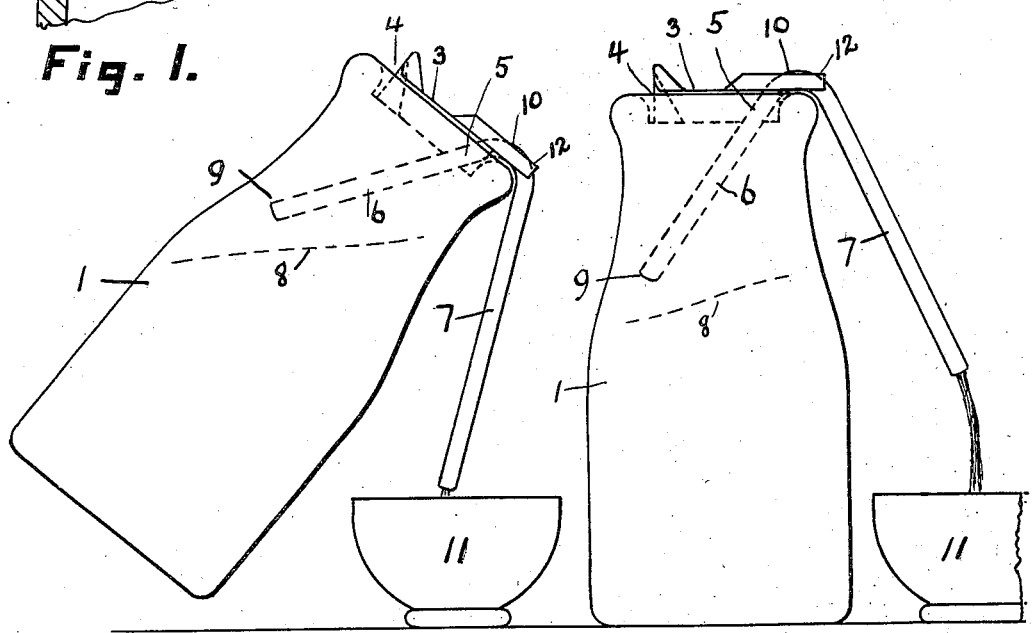

In the drawing Fig. 1 represents the upper part of a common milk bottle in section and approximately of natural size. Fig. 2 is a natural size top view of the stopper and a part of the siphon. Fig. 3 is a view, on a smaller scale, of the assemblage when the siphon has just started into action. Fig. 4 is a view of the same assemblage after the siphon has been started into action and is running without attention.

In the drawing, 1 represents a part of a common milk bottle of the pint size. The common "paper stopper" rests on the ledge 2 when the bottle is delivered, but is not shown here. The main supporting member 3 of my device is adapted to make a liquid tight joint for a large part of, but not necessarily of the entire, circumference between said member and the top of the bottle when said member is seated on ledge 2, and it need be tight against a pressure of a few inches of water only. When in place on ledge 2 it is very close to, or in actual contact with, the surface of the cream. A hole or notch 4 extends through the left side of the member 3 and this hole is aways open hence atmospheric pressure is always on the cream. Hole 4 opens toward the left.

On the opposite side of the member 3 another hole 5 passes from the under side of 3 in an upwardly sloping direction to the upper right hand side of said member. Through this hole 5 is passed, liquid tight, the short arm 6 of the siphon whose outer, and longer, arm is shown at 7. The intake end of the inner arm 6 should reach just above the junction plane between the cream and the milk, and should be near the left hand side of the inside of the bottle, as indicated at 9. The crest of the siphon is shown at 10.

In practice the filled bottle, in which cream has accumulated, is set vertically on a table, or other level surface, and a cup 11 to hold the cream is set beside it. The common "paper stopper" is then removed and my device is seated on the ledge 2, the long arm 7 of the siphon being over the cup 11. The top of the bottle is then inclined toward the cup side, see Fig. 3. This movement carries the upper left hand corner of the cream relatively higher and the crest of the siphon relatively lower than when the bottle is upright, so that with a comparatively small departure of the bottle from the vertical, the highest point of the cream becomes higher than the crest of the siphon. In this condition cream flows by gravity over the crest and into the siphon. The latter thus fills and begins to discharge cream into cup 11. At that moment the bottle is returned to its vertical position, see Fig. 4, and the siphon, having been started, flows until the surface of the cream has fallen below the intake end of the short arm 6. Air then enters the siphon and stops its action. The only liquid removed is that above the intake of the siphon.

A few seconds only are required to remove the bottle from, and restore it to, its vertical position. The movements should be smoothly performed so as not to disturb the lower cream plane unnecessarily. During the inclination of the bottle the cream tends to leave the right hand side of the bottle and to move toward the left side in a line across the bottle, as indicated by 8 of Fig. 3 instead of 8 of Fig. 1. When the cream leaves the right hand side of the bottle the milk rises on this side nearer to the ledge 2. For this reason the intake end of the arm 6 must be well over to the left side of the bottle so that it will always be submerged in cream, otherwise the siphon would begin to deliver milk. Mixed cream and milk will not "whip".

The siphon tube 6 and 7 is supported by its connection with the member 3 and this contact is a frictional one between the member 3 and the tube of the siphon. Therefore the siphon may have its angular position disturbed where it passes through the hole 5. In order that the notch 4 may always be in the plane of the arms of the siphon, which is the desirable position, the right hand top of the member 3 may carry two integral horns 12 which project on each side of the curved crest 10 of the siphon. These horns are close to the sides of the siphon and reach far enough away from the axial line of the arm 6 to prevent the siphon from turning from the plane which includes notch 4.

Since these milk bottles are delivered practically filled to the paper stopper that rests on ledge 2 they remain filled when they are inclined. When my stopper 3 is substituted for the "paper stopper" the bottle may be inclined to a large angle without leakage. Inclining the top of the bottle toward the crest of the siphon raises the cream of the air passage (4) side of the stopper relatively to the crest of the siphon until said cream is higher than said crest, therefore cream finally flows through said siphon. This difference of level between the high point of the cream and the crest of the siphon is sufficiently great to initiate the siphon flow notwithstanding occasional failures of the milk distributor to completely fill the bottle to the "paper stopper ledge" 2.

When the stopper is to be seated on the ledge 2 the short arm of the siphon must first enter the cream, and its entrance into the fluid in the bottle causes a rise of the fluid at the top of the bottle. This is due to the thickness of the walls of the siphon which displace the fluid. For a thin walled metal tube the rise is small. For sanitary reasons a glass tube is desirable. This necessitates a comparatively thick walled tube that may have the strength to withstand ordinary kitchen usage. Since these bottles are delivered filled flush with the top of the ledge 2, when such a glass tube is inserted into the fluid in the bottle the fluid rises slightly above the ledge 2, and the final seating of the stopper on the ledge causes the fluid to rise in the air passage. In order to prevent a spill it is necessary that the air passage 4 has a cubic capacity greater than the displacement caused by the submergence of the short arm of the siphon into the fluid contents of the bottle.

I claim:

1. A cream remover for milk bottles consisting of a stopper made of a resilient material adapted to make a fluid-tight joint with the top of said bottle—a vent from the under to the upper side of said stopper near one side of said stopper—the short arm of a siphon passing through said stopper at the opposite side from said vent, the intake of said siphon being on the same side of said bottle as said vent—horns, integral with said stopper, on each side of said siphon, said horns adapted to embrace both arms of said siphon below the crest of said siphon, whereby a plane containing the axis of said bottle also contains the said vent and the arms of said siphon when said stopper is seated on said bottle—and the long arm of said siphon reaching below the level of the intake of said siphon.

2. In cream removers operated by inclining the milk bottle to initiate the operation of the siphon and in which an air vent is always open between the upper and lower sides of the stopper, a stopper made of resilient material adapted to make a fluid-tight joint with the top of said bottle—the short arm of a siphon passing through one side of said stopper—a vent at the diametrically opposite side of said stopper from said siphon, said vent having a volumetric capacity greater than the volume displaced by the submergence of the short arm of said siphon when said stopper is seated on said bottle.

RAY G. COATES.